Figure 1:
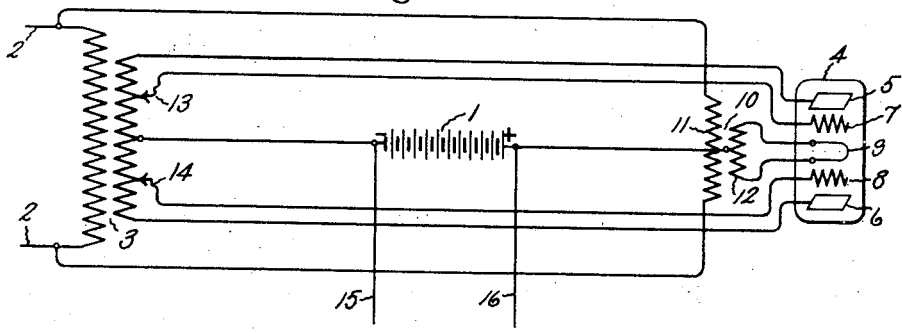

June 18, 1929.  A. W. HULL  1,717,563
CHARGING OF STORAGE BATTERIES
Filed Nov. 1, 1926

Inventor:
Albert W. Hull

Patented June 18, 1929.

1,717,563

UNITED STATES PATENT OFFICE.

ALBERT W. HULL, OF SCHENECTADY, NEW YORK, ASSIGNOR TO GENERAL ELECTRIC COMPANY, A CORPORATION OF NEW YORK.

CHARGING OF STORAGE BATTERIES.

Application filed November 1, 1926. Serial No. 145,419.

My invention relates to apparatus for controlling the charging of storage batteries and has for its principal object the provision of an improved apparatus and method of control whereby the voltage of a storage battery may be readily maintained within a very limited and predetermined range of values.

Various types of apparatus have been utilized in the past to rectify and control the charging current supplied from an alternating current source to a storage battery. Many of these apparatus comprise a vapor electric rectifier which is provided with a cathode and an anode mounted within an evacuated vessel.

It is well known that a vapor electric rectifier will begin to transmit current between its cathode and anode only when the effective voltage of the space around its cathode is positive with respect to some part of its cathode. In the case of a vapor electric rectifier provided with a grid or control electrode, this effective voltage may, by proper design, be made to depend almost entirely upon the grid potential. Hence the criterion for the passage of current between the cathode and anode of such a rectifier is that the grid potential shall be positive with respect to some part of the cathode.

Under the usual conditions of operation, the starting of current between the cathode and anode of a vapor electric rectifier produces positive ions which spread rapidly throughout the evacuated vessel and form insulating shields around the conductors of the grid whereby the grid is rendered incapable of influencing or stopping the anode current. Due to the fact that this current is necessarily interrupted at the end of each half cycle, however, control of the anode current by the grid is readily secured twice during each cycle of the anode voltage. Under these conditions, the magnitude of the anode current is comparatively large if the grid potential becomes positive with respect to some part of the cathode early in each half cycle of the anode voltage and this magnitude is progressively decreased as the time at which the grid becomes positive is made to occur later and later in the half cycle.

I have discovered that these characteristics of the vapor electric rectifier have peculiar utility in the charging of storage batteries for the reason that the charging current may be readily started, may be progressively decreased in value in response to increase in the battery voltage, and may be interrupted in response to a voltage slightly higher than the normal voltage of the battery. In accordance with my invention, these results are accomplished by supplying charging current to the battery through a vapor electric rectifier which comprises a grid arranged to be charged to a potential dependent on the battery voltage.

My invention will be better understood from the following description when considered in connection with the accompanying drawings and its scope will be pointed out in the appended claims.

Figure 2:
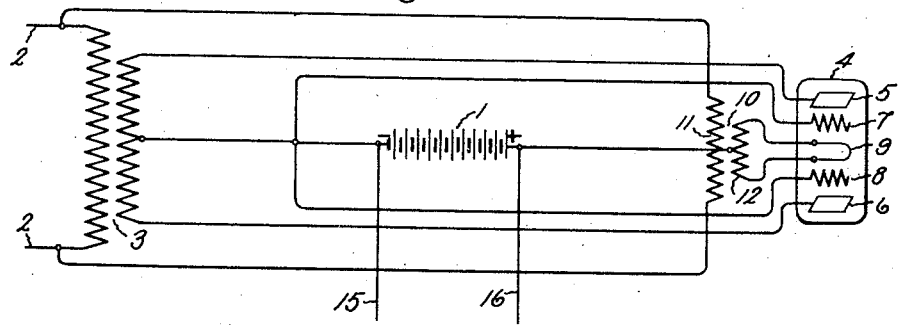
Figure 3:
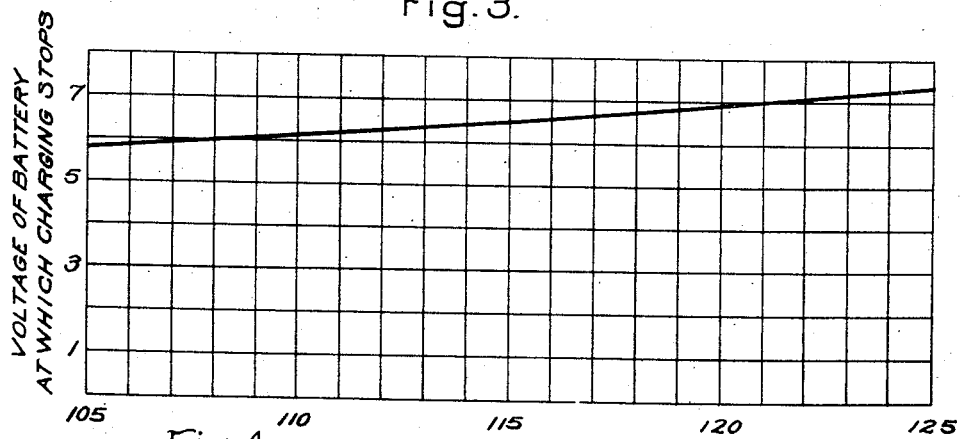
Figure 4:
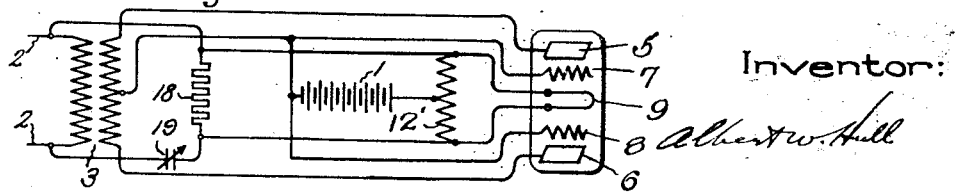

Referring to the drawings, Figs. 1 and 2 illustrate battery charging apparatus wherein my invention has been embodied; Fig. 3 is a curve relating to the operation of these apparatus; and Fig. 4 illustrates certain details in a modified embodiment of the invention.

Fig. 1 shows a storage battery 1 which is connected to alternating current supply lines 2 through means comprising a transformer 3 and a space discharge device 4. This device contains a gas such as mercury vapor or the like and is provided with anodes 5 and 6, grids 7 and 8 and a cathode 9. Heating current is supplied to the cathode 9 from the alternating current circuit 2 through a transformer 10 which comprises a primary winding 11 and a secondary winding 12. It will be observed that points intermediate the end terminals of the secondary windings of the transformers 3 and 10 are interconnected through the battery 1 and that the grids 7 and 8 are connected to the cathode 9 through the battery 1 and secondary terminals 13 and 14 of the transformer 3. With these connections, three component voltages are applied between the most negative part of the cathode 9 and the grid which is positively charged at any given instant.

Thus when the upper secondary end terminal of the transformer 3 has a positive polarity, the anode 5 and grid 7 are positively charged, the lower terminal of the cathode 9 is most negative, and the potential between this terminal and the grid 7 is the resultant sum of one-half the secondary voltage of the transformer 10, the whole of the voltage of the battery 1, and the voltage of the secondary turns included between the negative terminal of the battery and the secondary terminal 13. It will of course be understood that the battery may be permanently connected to a translating device through leads 15 and 16.

Assuming the various connections to be as illustrated and the alternating supply circuit 2 to be energized, the grid potentials of the device 4 are equal to resultant voltages which are the difference between the voltage of the battery and the sum of the alternating voltages applied to the grid circuits through the transformers 3 and 10. When the maximum sum of these alternating voltages is substantially equal to the battery voltage, no charging current is supplied to the battery for the reason that the potentials of the grids never become positive with respect to the most negative part of the cathode. As the voltage of the battery decreases, however, the resultant difference between the battery voltage and the sum of the alternating voltages increases and eventually becomes large enough to start the charging current through the rectifier.

When charging of the battery is started, the charging current is comparatively large due to the fact that the voltage of the battery is a minimum and the charging current starts through the rectifier near the beginning of each half cycle. As the voltage of the battery increases, however, the magnitude of the charging current decreases for the reason that current is started through the rectifier later and later in each half cycle of the anode voltage. Interruption of the charging current occurs when the magnitude of the battery voltage slightly exceeds that of the resultant sum of the alternating component voltages applied to the grid circuits. Charging of the battery is thus controlled in a manner to initiate charging when the battery voltage decreases to a predetermined value, to progressively decrease the charging current as the battery voltage increases, and to interrupt the charging current when the battery is fully charged.

Fig. 2 shows a slightly modified form of the apparatus wherein the battery voltage is balanced against the alternating voltage applied to the grid circuits through the transformer 10. The operation of this modified form of the apparatus is similar to that previously set forth and will be apparent without further description. It should be understood that it is possible to balance the battery voltage against one half the secondary voltage of the transformer 10 only when the resistance of the cathode bears a fairly definite relation to the battery voltage. In the case of the apparatus shown by Fig. 1, the relation between the battery voltage and the cathode resistance is of course unnecessary for the reason that the terminals 13 and 14 may be adjusted to control the component alternating voltage applied to the grid circuits through the transformer 3.

The criterion of charging or not charging is mainly the grid voltage. The anode voltage has very little effect. As previously indicated, the grid voltage which is effective to regulate the charging current is that between the grid and the most negative part of the cathode. Since the grid voltage depends on the alternating current supply circuit voltage, the voltage at which the charging current is interrupted will depend to some extent on the line voltage. The relation between the line voltage and the battery voltage at which current is interrupted is shown by the curve of Fig. 3.

Taking 115 volts as the normal alternating supply line voltage and taking the normal voltage of the fully charged battery as 6.2 volts, it has been found, as indicated by the curve of Fig. 3, that the battery will charge up to 6.5 volts and stop when the line voltage is normal. When the charging current is interrupted, the battery voltage tends to decrease to about 6.2 volts but charging is started each time the battery voltage decreases to about 6.45 volts. If the line voltage falls to 110, charging continues up to a battery voltage of 6.2 volts under which conditions the battery is fully charged. If the line voltage is 120, the battery will charge to 7 volts which is still a safe value and is accompanied by only slight gassing. Such periods of variation in the line voltage generally comprise but a small fraction of each 24 hours and their effect on the battery is not a serious factor in the operation of the apparatus.

As previously explained, the charging current is tapered or progressively decreased with increase in battery voltage due to the change in grid potential produced by charging of the battery. Various means may be provided for modifying the magnitude of the charging current. Fig. 4 illustrates one means of accomplishing this result.

This figure shows an apparatus which differs from that of Fig. 2 in that a phase control device comprising a resistor 18 and a capacitor 19 have been interposed between the primary circuit of the alternating current supply line 2 and the primary circuit of the cathode heating transformer which is shown as an auto-transformer 12'. With these connections the phase of the alternating voltage applied to the grid circuit through the cathode heating transformer may be shifted with respect to the phase of the anode voltage and starting of the charging current in each half cycle of the anode voltage may be produced either before or after the point at which it would otherwise occur. It will of course be apparent that tapering of the battery charge may also be accomplished either by making the mesh of grids 7 and 8 unequal or by adjusting the secondary terminals 13 and 14 to produce inequality in the component alternating voltages applied to the circuits of grids 7 and 8 through the transformer 3.

The embodiments of the invention illustrated and described herein have been selected for the purpose of clearly setting forth the principles involved. It will be apparent, however, that the invention is susceptible of being modified to meet the different conditions encountered in its use and I therefore aim to cover by the appended claims all modifications within the true spirit and scope of my invention.

What I claim as new and desire to secure by Letters Patent of the United States is:

1. The combination of alternating current supply means, a space discharge device containing an ionizable medium and provided with an anode and a filamentary cathode and with a gird arranged to control the starting of current between said cathode and anode, a battery connected to said supply means through said cathode and anode, and means arranged to apply to said grid a voltage which is dependent on the potential drop between the terminals of said cathode.

2. The combination of alternating current supply means, a vapor electric rectifier, provided with an anode and a filamentary cathode and with a grid arranged to control the starting of current between said cathode and anode, a battery connected to said supply means through said cathode and anode, and means operable to apply to said grid a resultant potential dependent on the voltage of said battery and the potential drop between the terminals of said cathode.

3. The combination of alternating current supply means, a space discharge device containing an ionizable medium and comprising a grid arranged to control the starting of current between its cathode and anode, a battery connected to said supply means through said cathode and anode, a transformer connected between said supply means and said cathode for supplying heating current to said cathode, and means arranged to apply to said grid a potential which is dependent on the relation between the secondary voltage of said transformer and the voltage of said battery.

4. The combination of alternating current supply means, a space discharge device containing an ionizable medium and comprising a grid arranged to control the starting of current between its cathode and anode, a battery connected to said supply means through said cathode and anode, a transformer connected between said supply means and said cathode for supplying heating current to said cathode, means arranged to apply to said grid a potential which is dependent on the relation between the secondary voltage of said transformer and the voltage of said battery, and means operable to control the phase relation between said secondary voltage and the voltage applied to said anode through said supply means.

5. The combination of a battery, a space discharge device containing an ionizable medium and comprising a grid arranged to control the current transmitted between its cathode and anode, means for transmitting heating current to said cathode, alternating current supply means comprising a terminal connected to said anode and a terminal connected to said cathode through said battery and said heating current transmitting means, and means arranged to connect said grid to said cathode through said battery and said heating current transmitting means.

In witness whereof, I hereunto set my hand this 30th day of October, 1926.

ALBERT W. HULL.